United States Patent

Gray et al.

[15] 3,646,807

[45] Mar. 7, 1972

[54] TRANSMISSIBILITY CONTROLLED VIBRATION TESTING APPARATUS AND METHOD

[72] Inventors: Robert P. Gray, Pebble Beach; John O. Beal, Pacific Grove, both of Calif.

[73] Assignee: Monterey Research Laboratory, Inc., Monterey, Calif.

[22] Filed: May 18, 1970

[21] Appl. No.: 38,162

[52] U.S. Cl. ............................................................73/71.6
[51] Int. Cl. .......................................................G01m 7/00
[58] Field of Search...................73/71.5, 71.6, 71.7, 67, 67.2; 92/8, 134; 60/62.5

[56] References Cited

UNITED STATES PATENTS

| | | | |
|---|---|---|---|
| 2,645,138 | 7/1953 | Mitchhart | 60/62.5 X |
| 2,886,965 | 5/1959 | Kugler | 73/71.6 |
| 3,228,672 | 1/1966 | Bresk et al. | 73/12 X |
| 3,485,083 | 12/1969 | Gray et al. | 73/12 |

FOREIGN PATENTS OR APPLICATIONS

| | | | |
|---|---|---|---|
| 122,916 | 1/1959 | U.S.S.R. | 73/71.6 |

Primary Examiner—Richard C. Queisser
Assistant Examiner—John P. Beauchamp
Attorney—Jack M. Wiseman

[57] ABSTRACT

Apparatus and method for the sinusoidal vibration testing of articles in which a fluid spring of an adjustable stiffness is disposed between a test table with a test specimen thereon and a mechanical reciprocator. The stiffness of the fluid spring controls the amplitude of vibration transmitted to the test specimen. By adjusting the opposing fluid pressure on either side of a piston or by adjusting volumetric capacity of the chamber on either side of the piston, the stiffness of the fluid spring can be regulated.

16 Claims, 9 Drawing Figures

PATENTED MAR 7 1972 3,646,807

INVENTORS
ROBERT P. GRAY
JOHN O. BEAL

Jack M. Wiseman
ATTORNEY

WINDOW REGULATOR

This invention relates generally to vehicle window regulators and in particular to a window regulator which incorporates lateral stabilizing means.

The trend in automobile design toward lower vehicles with increased window area significantly increases the difficulty of reducing to practice a window regulator which adequately performs the window guiding function and which is economical to manufacture and which occupies a minimum amount of space in the window storage well. The problem is compounded in those vehicles known as hardtop sedans wherein no window guides are provided above the vehicle belt line so that, in addition to the window regulator, window-stabilizing means are required below the vehicle belt line to impart lateral stability to the portion of the window above the belt line. As exemplified by Leslie, et al. U.S. Pat. No. 2,862,703, issued Dec. 2, 1958 and assigned to the assignee of this invention, the past practice has been to provide separate units for guiding the window between the open and closed positions and for imparting lateral stability thereto. This practice, however, usually results in a complicated structure which is relatively expensive to manufacture and which consumes valuable storage space in the window well. A window regulator according to this invention combines in a single relatively simple unit the window lifting and guiding function and the lateral stabilizing function.

The primary feature of this invention is that it provides a new and improved window regulator which incorporates into a single compact unit means supporting the window on the vehicle body for bodily movement between open and closed positions and lateral stabilizing means. Another feature of this invention is that it provides a window regulator including a first arm attached to the window for lateral rigidity and for pivotal movement about a fixed axis of the window and guide means associated with the first arm defining therefor a curvilinear path of motion between an operative position in the closed position of the window extending a substantial distance below the vehicle belt line and cooperating with primary stabilizing means at the vehicle belt line to provide lateral window stability and an inoperative position in the open position of the window oriented generally flush with an edge of the latter. Still other features of this invention reside, first, in the provision of a second arm connected to the window and, second, in the provision of guide means associated with the second arm defining a curvilinear path of motion therefor, the first and second arms cooperating to guide the window between the open and closed positions in a curvilinear path which is the resultant of the curvilinear paths of the first and second arms. Yet another feature of this invention resides in the provision of a common pivotal connection between the first and the second arms and a window lift arm supported on the vehicle body for pivotal movement, the lift arm thereby performing the dual function of driving the window between the open and closed positions and defining a component of the curvilinear paths of motion of each of the first and the second arms.

These and other features of this invention will be readily apparent from the following specification and from the drawings wherein:

FIG. 1 is a partially broken away fragmentary view of the right rear quarter of an automobile vehicle body, as seen from interiorly thereof, having a window regulator according to this invention and showing the window in a closed position;

FIG. 2 is similar to FIG. 1 but showing the window in an intermediate position and an open position, respectively, in broken and solid lines;

FIG. 3 is an enlarged view of a portion of FIG. 1;

FIG. 4 is an enlarged sectional view taken generally along the plane indicated by lines 4—4 in FIG. 1;

FIG. 5 is an enlarged sectional view taken generally along the plane indicated by lines 5—5 in FIG. 1;

FIG. 6 is an enlarged sectional view taken generally along the plane indicated by lines 6—6 in FIG. 1; and FIG. 7 is a sectional view taken generally along the plane indicated by lines 7—7 in FIG. 3.

Referring now to FIGS. 1 and 2 of the drawings, a hardtop sedan-type automobile vehicle body 10, as viewed from the interior thereof, includes a roof structure 12 sloping downward toward the rear of the vehicle and merging with a right quarter panel structure 14. As seen best in FIGS. 1, 2 and 6, the quarter panel structure includes an outer panel 16, an intermediate panel 18 hemmed flanged to the outer panel, and an inner panel 20. The roof structure 12 cooperates with the right quarter panel structure 14 in defining a longitudinally extending undivided window opening 22 the lower edge of which is defined by the vehicle belt line 23 and below which is situated a quarter window storage well 24 defined by the intermediate panel 18 and inner panel 20 of the right quarter panel structure. A right rear wheel house illustrated diagrammatically at 25 projects into the storage well 24 below a portion of window opening 22. The storage well 24 communicates with the window opening 22 through an elongated aperture 26, FIG. 6, situated at the belt line 23 and between inner panel 20 and outer panel 16 of the quarter panel structure. As seen best in FIG. 6, the outboard edge of aperture 26 is lined with a resilient seal 28 affixed to intermediate panel 18 and the inboard edge is lined with a similar resilient seal 30 affixed to inner panel 20. A glass window 32 is adapted to selectively close the opening 22 and is supported on the vehicle body for bodily movement in a predetermined curvilinear path between a closed position, FIG. 1, sealingly closing the window opening 22 and an open position, FIG. 2, remote from the window opening and situated within the storage well 24 by a window regulator according to this invention designated generally 34.

Referring to FIGS. 1 through 5, the window regulator 34 includes a first arm 36. The first arm 36 includes a generally flat web portion 38 and a sidewall 40 extending perpendicularly thereto and substantially around the periphery thereof, the sidewall 40 being stepped or relieved, as at 42 in FIG. 4, to provide a raised U-shaped surface 43. A flat U-shaped flange member 44 is affixed to raised surface 43 on the sidewall 40, as by welding, and projects beyond the sidewall 40 on opposite sides of and across the top of the first arm 36. As seen best in FIG. 4, a rivet 46 affixed to the first arm 36 at the lower end thereof rotatably supports a roller follower 48, the latter being maintained in spaced relation to the arm by a spacer 50. The roller follower 48 guidingly engages a first cam channel 52 rigidly affixed to inner panel 20 of the right quarter panel structure by conventional means, not shown.

As seen best in FIGS. 1, 2, 4 and 5, and aperture 54 in the window 32 is situated generally adjacent the lower edge of the latter and receives a resilient grommet 56. A generally triangular bearing plate 58 having an integral flange 60, a circular embossed surface 62 with an aperture 64 situated in the center thereof, and a flat bearing surface 66 surrounding the embossed surface 62 abuts the window 32 over the resilient grommet 56, the aperture 64 being aligned with the grommeted aperture 54 in the window. A reduced diameter portion of a pivot pin 68 projects through the aperture 64 in the bearing plate 58 and into the grommeted aperture 54 while a shoulder 70, FIGS. 4 and 5, on the pin engages the bearing surface 66. The pin 68 is rigidly affixed to the window by a nut 72 threadedly received on the end thereof and shoulder 70 simultaneously maintains the bearing plate rigid with respect to the window. Referring particularly to FIG. 4, a retaining member 74 including a web portion 76, an integral flat rear flange 78, and an integral front flange 80 having a U-shaped recess 82 therein is rigidly affixed to the bearing plate 58, as by welding. The web 76 projects beyond the plane of bearing surface 66 on the bearing plate so that a gap exists between the front flange 82 and the bearing surface 66, FIG. 4.

As seen best in FIG. 4, an aperture 84 located at the center of curvature of the upper end of the first arm 36 rotatably receives the pivot pin 68 while flange member 44 on the first arm, at the top of the latter, is captured by flange 60 on the retaining member 58 and at the bottom, on opposite sides of the first arm, is captured between the front flange 80 on the retaining member and the bearing surface 66. The pivot pin 68 thus supports the first arm 36 on the window in lateral rigidity for establishing communication between the uppermost chamber of the cylinder 24 and the housing 40. Likewise, formed at the lower end of the cylinder 24 are a plurality of large ports 46 for establishing communication between the lowermost chamber of the cylinder 24 and the housing 40.

Received by the opening 31 of the lower end cap 30 is a piston rod 49 for a lower piston 50 of the vibrator exciter 20. The piston 50 and the rod 49 are made of suitable metallic material. A Teflon O-ring seal 51 and a seal 52 maintain a fluidtight seal between the piston 50 and the fiber glass cylinder 24 while minimizing the friction therebetween. The Teflon O-ring seal 33 maintains a fluidtight seal between the piston rod 49 and the Teflon gland 32 of the end cap 30 while minimizing the friction therebetween. Movement of the piston rod 49 imparts a corresponding movement of the piston 50 within the cylinder 24, which, in the typical embodiment, is a double amplitude of 1 inch. Connected to the piston rod 49 is a connecting rod 55 of the vibrator exciter 20 which imparts a rectilinear motion to the piston rod 49. The distal end of the connecting rod 55 engages the wall of an eccentric peripheral groove 56a formed in the crankshaft 56. Rotation of the crankshaft 56 causes the connecting rod 55 to move in a generally sinusoidal motion, which connecting rod 55 imparts a generally sinusoidal motion to the lower piston 50 over a rectilinear path through the piston rod 49.

Bearings 57 and 58 support the crankshaft 56 for rotation. A wrist pin 59 connects the connecting rod 55 to the crankshaft 56. A housing 60, which encloses the crankshaft 56 and the connecting rod 55, is suitably secured to the lower end of the housing 40. Oil is disposed within the housing 60 to lubricate the bearings 57 and 58 and the wrist pin 59. Suitable plugs 61 are carried by the housing 60.

For rotating the crankshaft 56, a suitable belt and pulley drive 65 is connected to the end of the crankshaft 56. A suitable motor 66 drives the belt and pulley 65 to impart rotation to the crankshaft 56. The regulation of the speed of travel of the piston 50 by adjusting the speed of rotation of the motor 66 controls the excitation frequency of the vibrator exciter 20. The belt and pulley drive 65 and the motor 66 are located in the housing 60. A partition 67 with an oil seal 68 shields the belt and pulley drive 65 and the motor 66 from the oil lubricating the bearings 57 and 58 and the wrist pin 59.

Figures 1, 2, 3:
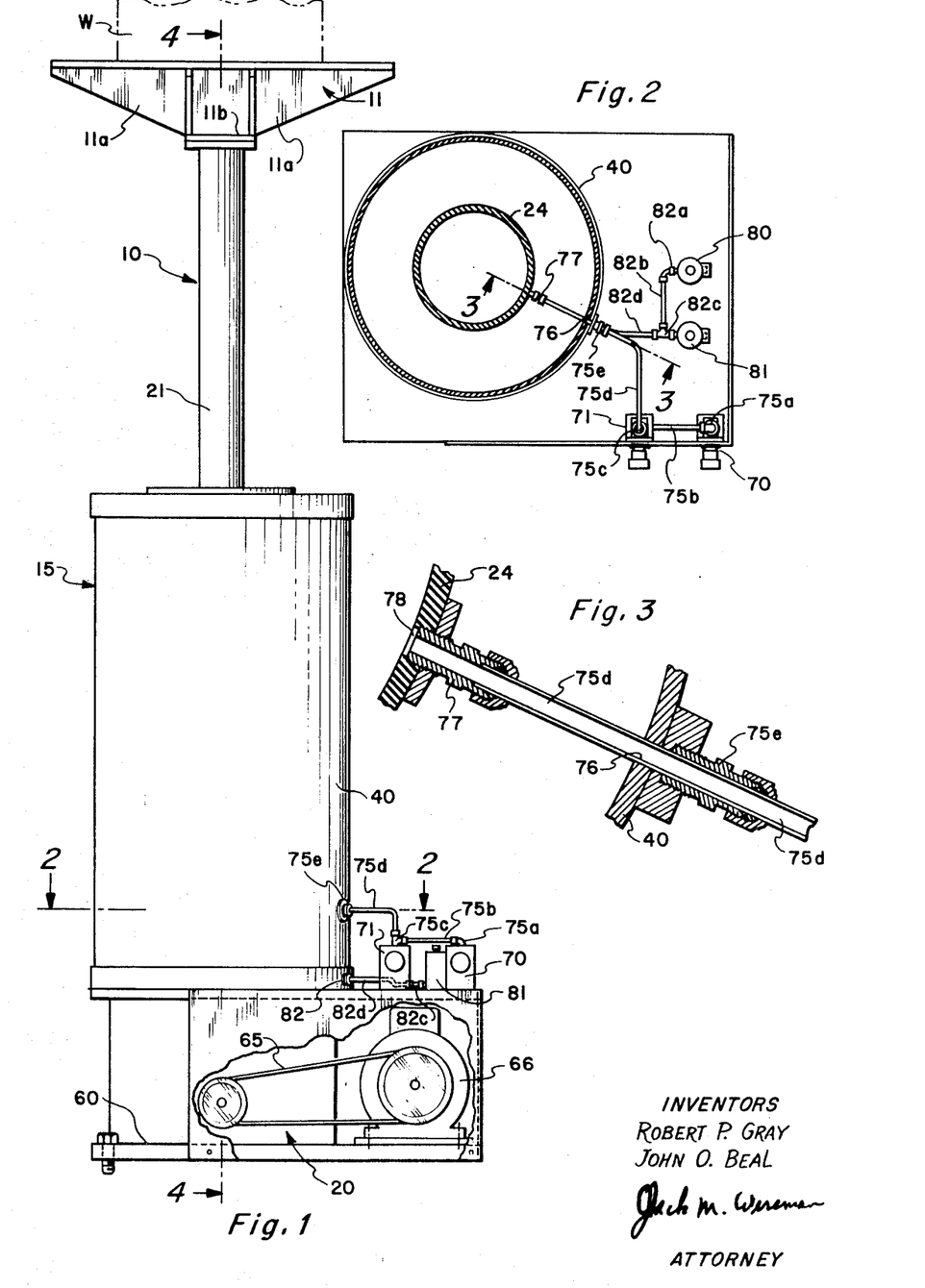
Fig. 1 is an elevation view of the vibration test apparatus of the present invention with a test specimen thereon and broken away to more particularly illustrate a vibration exciter.
Fig. 2 is a horizontal section view of the vibration test apparatus of Fig. 1 taken along 2-2 of Fig. 1.
Fig. 3 is an enlarged axial section view taken along line 3-3 of Fig. 2 to illustrate conduits for conducting fluid under pressure into a cylinder for the fluid spring.

Fluid under pressure, such as air or nitrogen, is supplied to the fluid spring 15. In the exemplary embodiment, air under pressure is employed. In this regard, the maximum pressure employed in the exemplary embodiment is 200 p.s.i. Air under pressure is supplied from a suitable source, not shown, which is conducted to a console, not shown. One outlet of the console is connected to the input side of a hand controlled valve 70 (FIGS. 1 and 2) and another outlet of the console is connected to the input side of a hand controlled valve 71. Suitable conduits, bends and connectors 75a–75c connect the output sides of the hand valves 70 and 71 to the housing 40 (FIGS. 1 and 2). The valve 70 controls the flow of air under pressure into the cylinder 24 and the valve 71 controls the flow of air under pressure from the housing 40.

Figure 4:
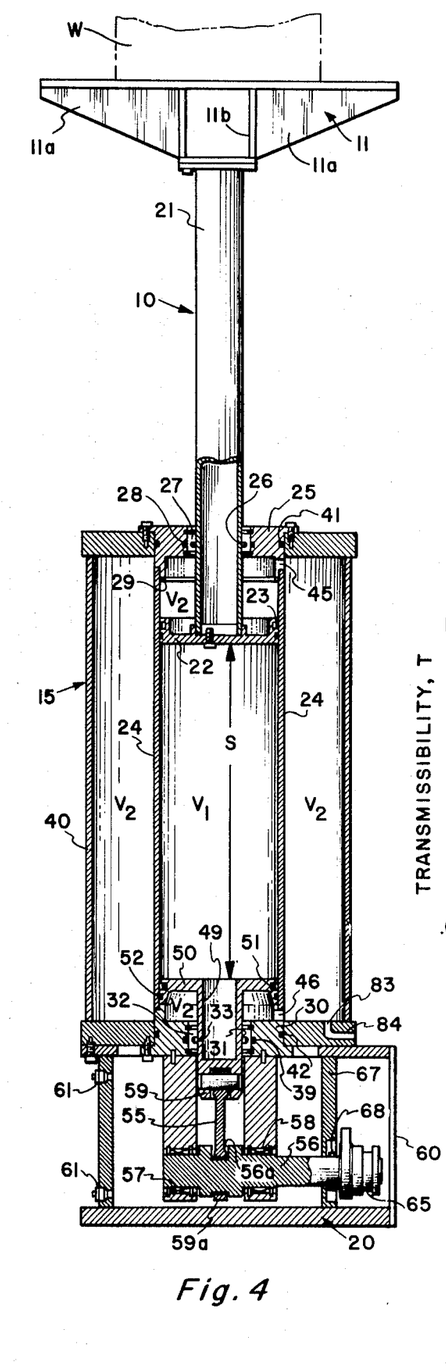
Fig. 4 is a longitudinal section view taken along line 4-4 of Fig. 1 to illustrate the apparatus of the present invention with the specimen table and a portion of the supporting post shown in elevation.

The conduit 75d is disposed through the wall of the housing 40 through an opening 76 (FIG. 3) and terminates in a connector 77 fixed to the cylinder 24. A port 78 is formed in the cylinder 24 so that air under pressure is discharged into the cylinder 24 between the upper piston 22 and the lower piston 50. The volume of the chamber in the cylinder 24 between the upper piston 22 and the lower piston 50 is referred to herein as $V_1$ (FIG. 4). The volume of the remaining space, which includes the space between the cylinder 24 and the housing 40, the space in the cylinder 24 above the piston 22 and the space in the cylinder 24 below the piston 50 is referred to herein as $V_2$.

The hand valves 70 and 71 are employed to initiate the first cycle or to bring the apparatus 10 to the desired starting point. In this manner, fluid under pressure enters the chamber of the cylinder 24 between the pistons 22 and 50. During this time, the space defining volume $V_2$ is vented. The distance between the upper piston 22 and the lower piston 50 is referred to herein as S.

Fluid under pressure from the console, not shown, is conducted to the input sides of suitable three-way solenoid valves 80 and 81 (FIGS. 1 and 2). Suitable conduits, bends and connectors 82a–82c connect the output sides of the solenoids 80 and 81 to the space defining the volume $V_2$ between the cylinder 24 and the housing 40 by way of a port 83 and a passageway 84 formed in the bottom wall of the housing 40. When the solenoid valves 80 and 81 are operated to increase the air under pressure, the spring rate of the fluid spring 15 is increased. Conversely, when the solenoid valves 80 and 81 are operated to vent the air under pressure in the housing 40, the spring rate of the fluid spring 15 is decreased. The valve 80 controls the flow of air under pressure into the cylinder 24 and the valve 81 controls the flow of air under pressure from the housing 40.

By adjusting the pressure under which air under pressure is conducted into the cylinder 24 between the pistons 22 and 50 and the volumetric capacities of the chamber defining the volume $V_1$ and the space defining the volume $V_2$, the spring rate of the fluid spring 15 can be regulated. Fluid springs in general have been disclosed in U.S. Pat. No. 3,485,083, issued to R. P. Gray et al. on Dec. 23, 1969 for Opposing Force Shock Programmer; U.S. Pat. No. 3,228,672, issued to F. C. Bresk et al. on Jan. 11, 1966 for Shock Programmer; and U.S. Pat. No. 3,226,974, issued to F. C. Bresk et al. on Jan. 4, 1966 for Shock Testing Apparatus In operation, the vibrator exciter 20 produces an input vibratory generally sinusoidal motion which is reflected in the rectilinear travel of the lower piston 50. Stated otherwise, the piston 50 travels over a rectilinear path within the cylinder 24 in a generally sinusoidal motion. This is accomplished through the motor 66 and the belt and pulley drive 65, which rotates the crankshaft 56. The crankshaft 56, in turn, imparts through its eccentric groove 56a a reciprocating movement and generally sinusoidal motion to the connecting rod 55. In turn, the connecting rod 55 moves the piston 50 through the piston rod 49 so that the piston 50 travels over a rectilinear path in a generally sinusoidal motion. The excitation frequency of the vibrator exciter 20 is controlled by the speed of the vibrator exciter 20. The amplitude of the piston 50 is fixed.

The vibratory motion produced by the vibrator exciter 20 is transmitted to the test table 11 and specimen W through the fluid spring 15. The stiffness or the spring rate of the fluid spring 15 is adjusted to control the amplitude of vibration transmitted to the test table 11. Toward this end, the pressure of the fluid, such as air, is controlled by the solenoid valves 70 and 71, to regulate the pressure of the air discharged into the cylinder 24 through the port 78 between the upper piston 22 and the lower piston 50. The stiffness or the spring rate of the fluid spring 15 can also be adjusted by regulating the volume $V_1$ of the chamber in the cylinder 24 between the upper piston 22 and the lower piston 50.

Thus, the vibration table 11 and the test specimen W are connected to the fixed amplitude reciprocating mechanical drive by the fluid spring 15 which has an adjustable spring rate. The speed of the vibration exciter 20 is varied to vary the excitation frequency. The stiffness of the fluid spring 15 is varied to control the amplitude of vibration transmitted to the test table 11.

Figure 5:
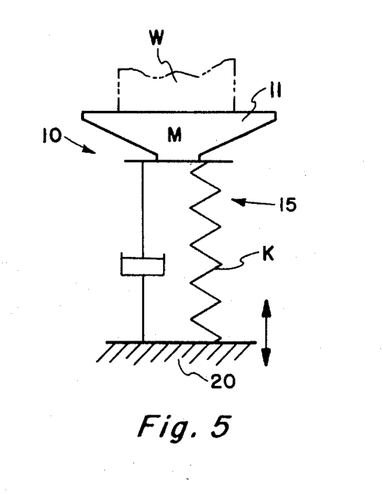
Fig. 5 is a schematic diagram of the apparatus of the present invention.

The natural frequency of the vibration test apparatus 10 is as follows:

$$fn = \frac{1}{2\pi}\sqrt{\frac{K}{M}}$$

wherein $K$ is the stiffness of the fluid spring 15 (FIG. 5) and $M$ is the mass of the table 11 and test specimen W (FIG. 5).

$M$ is a fixed value under a given test condition and $K$ is a variable. Thus, the value of $K$ is varied to change the natural frequency $fn$.

Transmissibility T for the vibration test apparatus 10 is the ratio of the amplitude of the sinusoidal motion of the table 11 to the amplitude of the reciprocating motion of the piston 50 of the vibration exciter 20. Transmissibility is determined as follows:

$$T = \frac{X}{A} = \frac{1}{1 - \left(\frac{fe}{fn}\right)^2}$$

wherein $X$ equals the amplitude of the sinusoidal motion of the table 11; and $A$ equals the reciprocating motion of the piston 50 of the vibration exciter 20; and $fe$ equals the forcing frequency or the frequency of the sinusoidal vibration of the vibrator exciter 20; and $fn$ equals the natural frequency.

Figure 6:
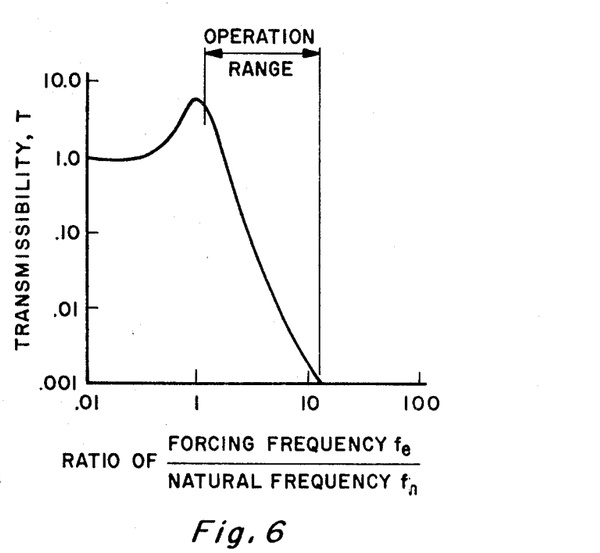
Fig. 6 is a graphic illustration of the transmissibility of the apparatus shown in Figs. 1-4.

A graphic representation of the transmissibility $T$ is shown in FIG. 6, which plots the transmissibility ($T$) with respect to the ratio of $$\frac{\text{Forcing Frequency } (fe)}{\text{Natural Frequency } (fn)}.$$

The apparatus is operated in the range designated operating range, which is to the right of the resonant peak in the graph shown in FIG. 6. Thus, at any given forcing frequency within the operating range, the amplitude of vibration transmitted to the test table 11 and test specimen W can be increased by increasing the stiffness or spring rate of the fluid spring 15, which raises the natural frequency ($fn$) and thereby lowers the ratio of the $$\frac{\text{Forcing Frequency } (fe)}{\text{Natural Frequency } (fn)}.$$

This results in the increasing of the transmissibility. Conversely, the amplitude of the sinusoidal vibratory motion transmitted to the test table 11 can be lowered by reducing the stiffness of the air spring.

Figures 7, 8, 9:
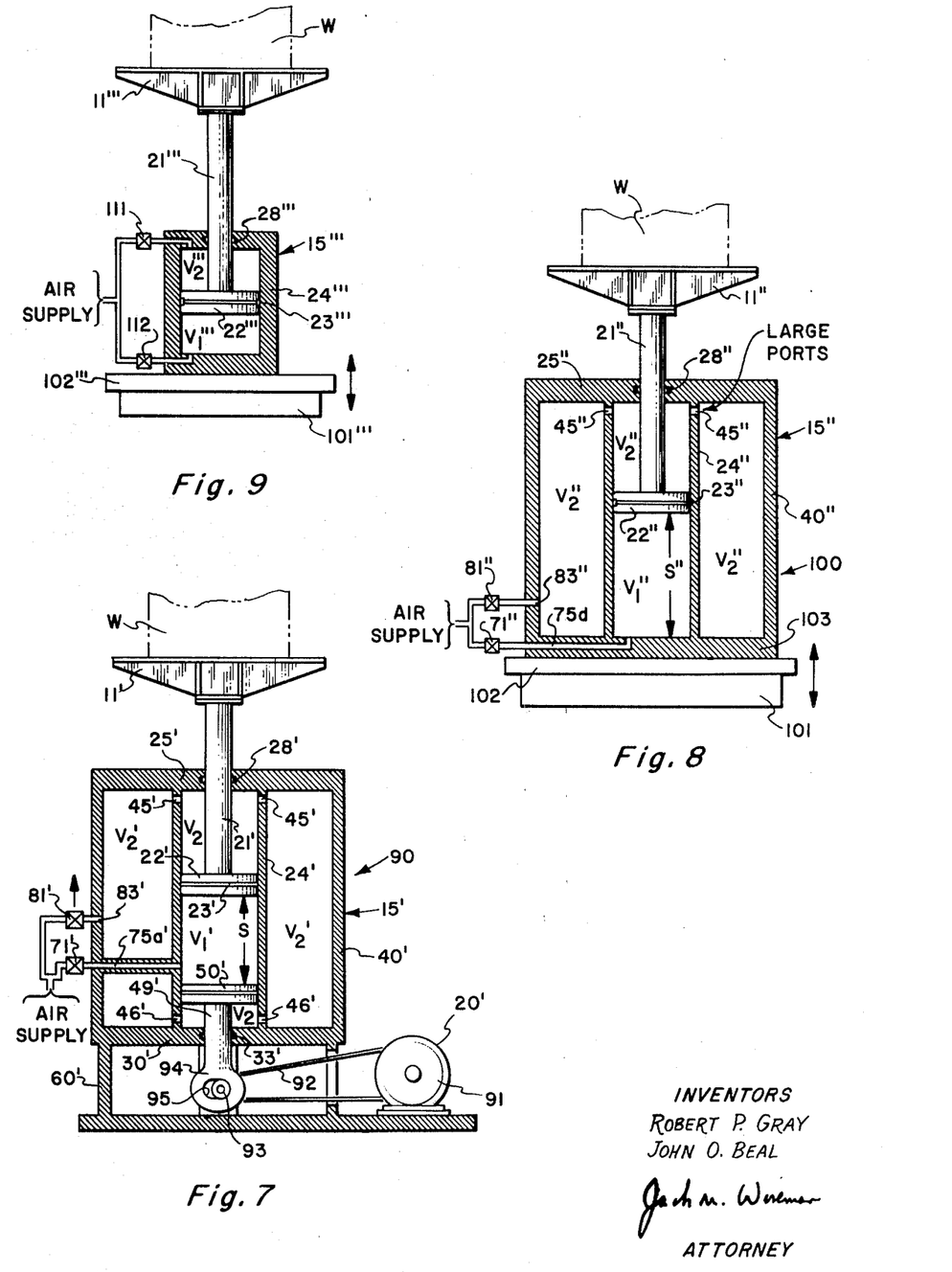
Fig. 7 is a longitudinal section view partially in elevation of a modification of the apparatus shown in Figs. 1-4 wherein the vibration exciter is a motor driven Scotch yoke for converting rotary motion into reciprocating motion.
Fig. 8 is a longitudinal section view, partially in elevation, of a further modification of the apparatus shown in Figs. 1-4, wherein the vibration exciter includes a table of a conventional vibration machine.
Fig. 9 is a longitudinal section view, partially in elevation of a still further modification of the apparatus shown in Figs. 1-4.

In FIG. 7 is illustrated a modification 90 of the vibration test apparatus 10 of FIGS. 1–4. Like parts have like reference numerals with a prime suffix. The vibration test apparatus 90 is similar in operation and in construction to the vibration test apparatus 10 with the exception that the vibration exciter 20' employs a Scotch yoke to convert a rotary motion into a reciprocating motion in lieu of a crankshaft and connecting rod. More specifically, the vibration exciter 20' comprises a variable speed motor 91 that drives a belt 92. The belt 92 in turn is trained around a pulley, not shown, which is fixed to a shaft 93 to rotate the same. The shaft 93 is received by an eccentric slotted opening 95 formed in the end of a Scotch yoke 94. The of the slotted opening 95 is engaged by a camming surface on the shaft 93. Through this arrangement, a reciprocating movement with a sinusoidal vibratory motion is imparted to the Scotch yoke 94, which, in turn, imparts a movement to the piston 50' and the piston rod 49' over a rectilinear path within the cylinder 24' having a sinusoidal vibratory motion.

A further modification 100 of the vibration test apparatus 10 is shown in FIG. 8. Like parts have like reference numerals with a double prime suffix. The vibration test apparatus 100 is similar in operation and construction to the vibration test apparatus 10 with the exception that the vibrator exciter 20" employs a conventional vibration machine 101, which may be of mechanical direct drive, or reaction type, electrodynamic, electrohydraulic or the like to impart a reciprocating sinusoidal vibratory motor to a table 102 thereof, which in turn imparts a reciprocating sinusoidal vibratory motion to the housing 40". Thus, the lower piston 50 has been eliminated. However, the bottom wall 103 of the housing 40" performs a function similar to the piston 50 and defines the distance S", which was previously discussed in connection with FIG. 5 as the distance between the upper piston 22 and the lower piston 50.

A high-frequency vibration testing apparatus 110 is illustrated in FIG. 9, which is similar to the vibration testing apparatus 100 of FIG. 8 with the exception that an opposing force fluid spring 15''' is employed in lieu of the fluid spring 15" and the housing 40" has been eliminated. The theory of operation of an opposing force fluid spring is disclosed in the patent to R. P. Gray et al. U.S. Pat. No. 3,485,083, issued on Dec. 23, 1969 for Opposing Force Shock Programmer. Valve 111 and pressure regulator 112 control, respectively, the flow of fluid under pressure, such as air or nitrogen, into the upper and lower chambers of the cylinder 24''' designated respectively, with a volume $V_2'''$ and $V_1'''$.

Gas under an adjustable predetermined pressure through the valve 111 is conducted to one chamber at one side of the piston 22''' and gas under another adjustable predetermined pressure is conducted through the pressure regulator 112 to the other chamber at the other side of the piston 22'''. In this manner, opposing forces are applied to the piston 22'''. By adjusting the pressure under which the fluids are respectively conducted into the cylinder 24''' on opposite sides of the piston 22''' and the volumetric capacity of the respective chambers of the cylinder 24''', the spring rate or stiffness of the fluid spring 15''' can be regulated.

What is claimed is:

1. A method of applying a vibrating motion to a support adapted to support an article to be tested comprising the steps of:
   a. producing a vibrating motion through movement over a rectilinear path,
   b. transmitting said vibratory motion to the support adapted to support an article through a connection with a piston within a pneumatic spring; said vibrating motion being transmitted by pneumatic pressure on said piston and
   c. adjusting the stiffness of said pneumatic spring through the application of opposing forces from gas under pressure on said piston within said pneumatic spring.

2. The method as claimed in claim 1 wherein the stiffness is adjusted to control the amplitude of the vibratory motion transmitted to said support.

3. The method as claimed in claim 2 wherein said vibratory motion is a generally sinusoidal motion.

4. The method as claimed in claim 3 wherein the vibratory motion produced is of a fixed amplitude.

5. Apparatus for vibration testing of an article comprising:
   a. a support for an article to be tested;
   b. a vibration exciter to produce a vibratory motion,
   c. a pneumatic spring disposed between said support and said vibration exciter for transmitting to said support the vibratory motion produced by said vibration exciter, said pneumatic spring comprises a cylinder, a piston disposed within said cylinder, a piston rod interconnecting said piston with said support for imparting vibratory movement to said support; and
   d. means for conducting gas under pressure into said cylinder on each side of said piston, the stiffness of said pneumatic spring being regulated by said means adjusting the application of opposing forces from gas under pressure on each side of said piston.

6. Apparatus as claimed in claim 5 wherein said pneumatic spring has the stiffness thereof adjusted to control the amplitude of the vibratory motion transmitted to said support.

7. Apparatus as claimed in claim 6 wherein said vibratory motion produced by said vibration exciter and the vibratory motion transmitted to said support are generally sinusoidal motions.

8. Apparatus as claimed in claim 7 wherein the vibratory motion produced by said vibration exciter has a fixed amplitude.

9. Apparatus as claimed in claim 5 wherein said cylinder is of a fiber glass material and said piston includes a Teflon O-ring for forming a gastight seal with said cylinder and for minimizing friction therebetween.

10. Apparatus as claimed in claim 9 wherein said pneumatic spring includes an end cap on said cylinder with an opening to receive said piston rod, and an O-ring in said cap surrounding said opening for forming a gastight seal with said piston rod and for minimizing friction therebetween.

11. Apparatus as claimed in claim 5, wherein said vibration exciter comprises a piston disposed in said cylinder, and means connected to said piston for imparting a reciprocating movement and a generally sinusoidal motion thereto.

12. Apparatus as claimed in claim 11 wherein said means for conducting gas under pressure into said cylinder discharges gas under pressure into said cylinder between said piston of said pneumatic spring and said piston of said vibration exciter.

13. Apparatus as claimed in claim 5, wherein said pneumatic spring includes a housing surrounding said cylinder and wherein said vibration exciter engages said housing for imparting a reciprocating movement and a generally sinusoidal motion thereto.

14. Apparatus as claimed in claim 5 wherein said means for conducting gas under pressure into said cylinder discharges the gas on both sides of said piston for the application of opposing force thereto.

15. Apparatus as claimed in claim 14 wherein said vibration exciter engages said cylinder for imparting a reciprocating and a generally sinusoidal motion thereto.

16. Apparatus as claimed in claim 5 wherein said cylinder is of a plastic material and said piston includes a Teflon O-ring for forming a gastight seal with said cylinder and for minimizing friction therebetween.

* * * * *

UNITED STATES PATENT OFFICE
CERTIFICATE OF CORRECTION

Patent No. 3,646,807      Dated     March 7, 1972

Inventor(s)     Robert P. Gray et al.

It is certified that error appears in the above-identified patent and that said Letters Patent are hereby corrected as shown below:

Columns 1 and 2 should be canceled and the matter appearing on the attached pages substituted therefor.

Signed and sealed this 7th day of November 1972.

(SEAL)
Attest:

EDWARD M. FLETCHER, JR.
Attesting Officer

ROBERT GOTTSCHALK
Commissioner of Patents

BACKGROUND OF THE INVENTION

The present invention relates in general to vibration test apparatus, and more particularly to a sinusoidal vibration test apparatus for the vibration testing of articles.

Vibration testing apparatus have been used for the vibration testing of products and packages. Such vibration testing apparatus can be classified as the following types of machines:

(a) Direct drive mechanical;

(b) Mechanical reaction type;

(c) Electro-dynamic;

(d) Electrohydraulic.

It has been found that the direct drive mechanical vibration test machine is limited in frequency range. In addition thereto, independent adjustment of the amplitude of vibration and independent adjustment of the exciting frequency are not available. The mechanical reactance type vibration test machine appears to be restricted in frequency range and in amplitude. As for the electrodynamic vibration test machine, it is relatively costly and complex. It is found to use excessive power. Likewise, the amplitude and lower frequency range is limited. Lastly, the electrohydraulic vibration test machine appears to be costly and complex. The power consumption is generally high. Also, it is a low frequency machine.

Vibration testing machines have been disclosed in the patent to Dickie, No. 2,773,482, issued on December 11, 1956 for Fluid-Operated Vibration Test Exciter; the patent to Kugler, No. 2,886,9( issued on May 19, 1959 for Resonant Mounting; and the patent to Holzman, No. 3,293,906, issued on December 27, 1966 for Testing Machine.

SUMMARY OF THE INVENTION

Apparatus and method for the vibration testing of articles wherein a fluid spring of adjustable stiffness is disposed between a specimen table adapted to support an article for vibration testing and a vibrator exciter.

The adjustment of the stiffness of the fluid spring serves to regulate the amplitude of vibration transmitted to the specimen table. The amplitude of the vibratory motion transmitted to the specimen table could be greater than, less than, or the same as the amplitude of the vibratory motion produced by the vibrator exciter. In addition thereto, the apparatus of the present invention has the following advantages:

(a) A generally wider vibration frequency range;

(b) Independent control over the amplitude of vibration transmitted to the specimen table;

(c) Independent control over the frequency of vibration transmitted to the specimen table;

(d) Greater amplitude of vibration transmitted to the specimen table;

(e) Lower frequency of vibration transmitted to the specimen table;

(f) Less expensive to manufacture without sacrificing reliability and durability;

(g) Less complicated to operate, adjust and manufacture;

(h) Less consumption of power.

DESCRIPTION OF THE PREFERRED EMBODIMENTS

Illustrated in Figs. 1-4 is the sinusoidal vibration testing apparatus 10 of the present invention, which comprises a test table 11 on which is carried a test specimen W. The test specimen W is fixed to the test table 11. Vibratory motion is transmitted to the test table 11 through a fluid spring 15 of adjustable stiffness. A vibratory exciter 20 produces a generally sinusoidal vibrating input motion for transmission to the test table 11 through the fluid spring 15. It is the adjustment of the fluid spring 15 that controls or regulates the amplitude of the transmitted sinusoidal vibratory motion imparted or applied to the test table 11.

The test specimen table 11 in the exemplary body is a metallic square plate with depending webs 11a and a centrally located cylindrical collar 11b. Fixed to the test table 11 is a specimen or article W. In the typical embodiment, the article W is in the form of a product or package to be subjected to a vibration test. A meter or oscilloscope, not shown, is connected to the test table 11 in a well-known manner to give a reading on the peak acceleration of the specimen table 11.

A metallic piston rod 21 of the fluid spring 15 has its upper end inserted into the collar 11b and is fixed to the table 11 for applying a vibratory motion thereto. The table 11 moves with the piston rod 21. At the lower end of the piston rod 21 is fixed a metallic piston 22 (Fig. 4) of the fluid spring 15. At the peripheral edge of the piston 22 are Teflon o-rings or seals 23. The piston 22 is received in sealing contact with the inner wall of a fiberglass cylinder 24 of the fluid spring 15. In the exemplary embodiment, a maximum amplitude or reciprocation for the piston rod 21 is five inches.

Fixed to the upper end of the cylinder 24 is an end cap 25 having an opening 26 through which the piston rod 21 moves. Surrounding the opening 26 is a Teflon gland 27 with Teflon o-rings or seals 28 of the end cap 25. An o-ring 28 is located between the gland 27 and the cap 25. The cap 25 seals the end of the cylinder 24. In the preferred embodiment, the fiberglass cylinder 24 is employed to form a smooth inner wall for reducing friction. Likewise, Teflon seals are employed to reduce friction. It has been found that by maintaining a minimum friction between the sliding, contacting portions of the piston rod 21, the end cap 25 and the cylinder 24 an improved operation is achieved. An annular pad 29 is attached along the peripheral flange of the end cap 25 to cushion the accidental impact with the piston 22. For the apparatus herein described, maintaining the friction below forty pounds is desirable.

At the lower end of the cylinder 24 in fixed relation therewith is an end cap 30 having an opening 31 formed therein. Surrounding the opening 31 is a Teflon gland 32 with Teflon o-rings or seals 33 to reduce friction. The cap 30 provides a seal at the lower end of the cylinder 24. Fluid seal o-rings 39 are disposed between the gland 32 and the cap 30.

Surrounding the cylinder 24 and fixed to the end caps 25 and 30 is a cylinder housing 40 of the fluid spring 15, which is made of suitable metallic material. An o-ring 41 provides a fluid seal between the housing 40 and the end cap 25. Similarly, an o-ring 42 provides a fluid seal between the housing 40 and the end cap 30. Formed in the cylinder 24 at the upper end thereof are a plurality of relatively large ports 45